US009223065B2

(12) United States Patent  
Jung et al.

(10) Patent No.: US 9,223,065 B2
(45) Date of Patent: Dec. 29, 2015

(54) OPTICAL FILM AND ORGANIC LIGHT-EMITTING DISPLAY DEVICE INCLUDING THE SAME

(71) Applicant: Samsung Display Co., Ltd., Yongin, Gyeonggi-Do (KR)

(72) Inventors: Woo-Suk Jung, Cheonan-si (KR); Soon-Ryong Park, Cheonan-si (KR); Hye-Jung Park, Cheonan-si (KR); Seok-Gi Baek, Yongin-si (KR); Tae-Eun Kim, Cheonan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 49 days.

(21) Appl. No.: 13/793,950

(22) Filed: Mar. 11, 2013

(65) Prior Publication Data

US 2013/0328479 A1 Dec. 12, 2013

(30) Foreign Application Priority Data

Jun. 12, 2012 (KR) ........................ 10-2012-0062766

(51) Int. Cl.
*H01L 51/52* (2006.01)
*G02B 5/02* (2006.01)
*H05B 33/12* (2006.01)
*G02B 27/00* (2006.01)

(52) U.S. Cl.
CPC .......... *G02B 5/0278* (2013.01); *G02B 27/0006* (2013.01); *H05B 33/12* (2013.01)

(58) Field of Classification Search
CPC .. G02B 5/0278; G02B 27/0006; H05B 33/12; H01L 51/50; H01L 51/52
See application file for complete search history.

(56) References Cited

U.S. PATENT DOCUMENTS

| | | | |
|---|---|---|---|
| 6,181,062 B1* | 1/2001 | Hiraishi et al. | 313/504 |
| 7,345,419 B2* | 3/2008 | Gotoh et al. | 313/504 |
| 2010/0195313 A1* | 8/2010 | Hiraishi et al. | 362/97.1 |
| 2012/0044182 A1 | 2/2012 | Seo et al. | |
| 2012/0313516 A1* | 12/2012 | Kim et al. | 313/512 |

FOREIGN PATENT DOCUMENTS

| | | |
|---|---|---|
| KR | 10-2005-0013918 | 2/2005 |
| KR | 10-2007-0031593 | 3/2007 |
| KR | 10-2007-0037093 | 4/2007 |

* cited by examiner

Primary Examiner — Donald Raleigh
(74) Attorney, Agent, or Firm — Robert E. Bushnell, Esq.

(57) ABSTRACT

Provided is an organic light-emitting display device. The organic light-emitting display device includes a display substrate having a base substrate and an organic layer disposed on the base substrate, an optical layer disposed on the display substrate and having a phase-delay film and a polarizing layer disposed on the phase-delay film, and several diffusion modules disposed between the display substrate and the optical layer and disposed separately from each other.

19 Claims, 10 Drawing Sheets

OPTICAL FILM AND ORGANIC LIGHT-EMITTING DISPLAY DEVICE INCLUDING THE SAME

CLAIM OF PRIORITY

This Application makes reference to, incorporates the same herein, and claims all benefits accruing under 35 U.S.C. §119 from an application earlier filed in the Korean Intellectual Property Office on 12 Jun. 2012 and there duly assigned Serial No. 10-2012-0062766.

BACKGROUND OF THE INVENTION

1. Field of the Invention

An embodiment of the present invention relates to an optical film and an organic light-emitting display device including the same, and more particularly, to an optical film which may improve display quality of an organic light-emitting display device including the optical film.

2. Description of the Related Art

Display devices used in portable electrical devices such as notebooks, mobile phones and portable media players (PMPs) as well as electrical household devices such as TVs and monitors are becoming lighter in weight and slimmer in size. Accordingly, various types of flat panel display devices are widely used, for example, liquid crystal display devices (LCDs), organic light-emitting display devices, and electrophoretic display devices. Among these flat panel display devices, organic light-emitting display devices are in increasing demand due to their advantages including lower power consumption, higher luminance, higher contrast ratio, and ease of realizing flexible display devices.

SUMMARY OF THE INVENTION

Aspects of the present invention provide an optical film and an organic light-emitting display device including the optical film and having an improved viewing angle.

Aspects of the present invention also provide an optical film and an organic light-emitting display device including the optical film and having an improved viewing angle while maintaining good black characteristics.

Aspects of the present invention are however not restricted to the one set forth herein. The above and other aspects of the present invention will become more apparent to one of ordinary skill in the art to which the present invention pertains by referencing the detailed description of the present invention given below.

In accordance with an aspect of the present invention, an organic light-emitting display device may include a display substrate having a base substrate and an organic layer disposed on the base substrate, an optical layer disposed on the display substrate and having a phase-delay film and a polarizing layer disposed on the phase-delay film, and several diffusion modules disposed between the display substrate and the optical layer and separated from each other.

In accordance with another aspect of the present invention, an organic light-emitting display device may include a display substrate having a base substrate and an organic layer disposed on the base substrate, an optical layer disposed on the display substrate and comprising a phase-delay film and a polarizing layer disposed on the phase-delay film, and an adhesive layer disposed between the display substrate and the optical layer and having several diffusion particles. The adhesive layer may include a diffusion region having a higher density of the diffusion particles and a transmission region having a lower density of the diffusion particles.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The present invention will now be described more fully with reference to the accompanying drawings, in which exemplary embodiments of the invention are shown.

An organic light-emitting display device displays an image using an organic light-emitting diode (OLED) as a light-emitting element. The OLED emits light of a luminance level in correspondence with an electric current that flows therethrough. An organic light-emitting display device may include several OLEDs and displays an image by controlling an electric current flowing through each of the OLEDs to control a gray level of each of the OLEDs.

An OLED includes an organic layer whose light emission is controlled by an electric current flowing therethrough. Characteristics of the organic layer may be degraded by oxygen and moisture; therefore, the organic layer of the organic light-emitting display device needs to be encapsulated in order to isolate the organic layer from oxygen and moisture. To encapsulate an organic layer, two substrates situated on both sides of the organic layer may be sealed with frit, or the organic layer disposed on a substrate may be covered with an encapsulation film.

The organic light-emitting display device includes components for encapsulating the organic layer, and at least some of the components are located on a path of light generated from the organic layer. The components located on the path of the light generated from the organic layer may reflect the light at their respective interfaces, thereby degrading the viewing angle of the organic light-emitting display device. When the organic light-emitting display device includes, as a component for encapsulating the organic layer, an encapsulation film having several organic films and several inorganic films, multiple interfaces exist within the encapsulation film. The multiple interfaces may significantly degrade the viewing angle characteristics of the organic light-emitting display device.

It is therefore necessary to improve the viewing angle of an organic light-emitting display device while maintaining good black characteristics.

Figure 1:
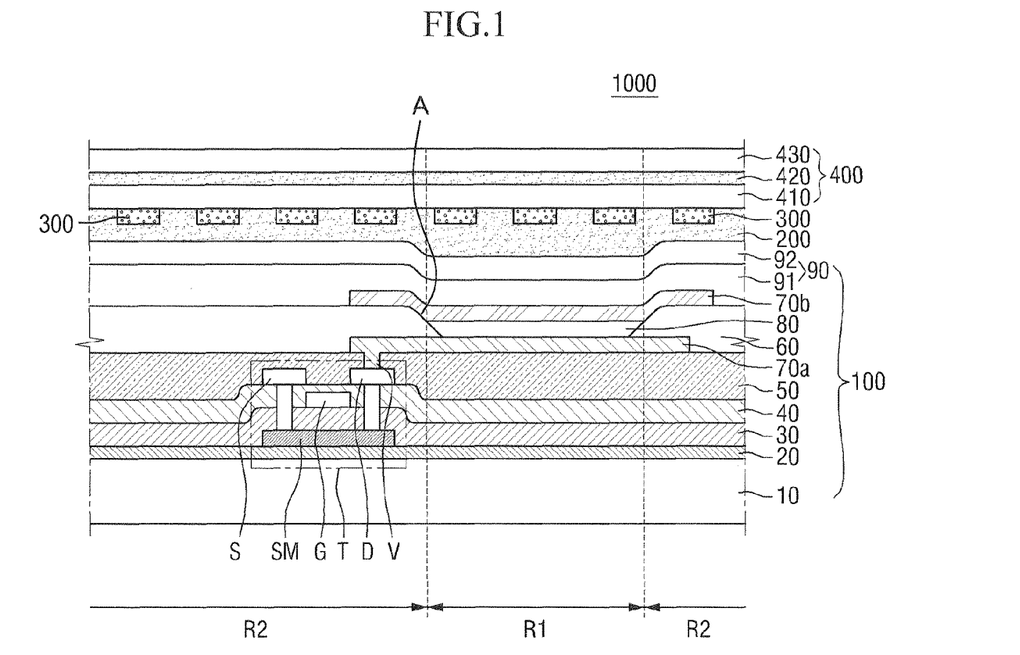
FIG. 1 is a cross-sectional view of an organic light-emitting display device constructed with the principle of an embodiment of the present invention.

FIG. 1 is a cross-sectional view of an organic light-emitting display device 1000 constructed with the principle of an embodiment of the present invention.

In reference to FIG. 1, the organic light-emitting display device 1000 constructed with the principle of the current embodiment includes a display substrate 100, an optical layer 400, and a plurality of diffusion modules 300.

The display substrate 100 includes a base substrate 10 and an organic layer 80.

The base substrate 10 may be made of a transparent insulating material. For example, the base substrate 10 may be made of glass, quartz, ceramic, plastic, or the like. The base substrate 10 may be shaped like a flat plate. In accordance with some embodiments, the base substrate 10 may be made of a material that may be easily bent by an external force. The base substrate 10 may support other components disposed thereon.

The organic layer 80 is disposed on the base substrate 10. The organic layer 80 may emit light when an electric current flows through the organic layer 80. Specifically, holes and electrons injected into the organic layer 80 combine together to form excitons. When an energy level of the excitons changes from an excited state to a ground state, the organic layer 80 may emit light of a color corresponding to the changed energy level. In accordance with some embodiments of the present invention, the color of light emitted from the organic layer 80 may be one of red, blue and green. The brightness of light emitted from the organic layer 80 may vary according to the size of an electric current that flows through the organic layer 80.

The display substrate 100 includes a light-emitting region R1 and a non-light-emitting region R2. The light-emitting region R1 may be a region which perpendicularly overlaps a light-generating region of the display substrate 100. In accordance with some other embodiments of the present invention, the light-emitting region R1 may be a region of the display substrate 100 which perpendicularly overlaps the region of the organic layer 80. The non-light-emitting region R2 may be defined as the other region of the display substrate 100 excluding the light-emitting region R1.

The display substrate 100 may further include a buffer layer 20, a semiconductor layer SM, a gate electrode G, a source electrode S, a drain electrode D, a gate insulating film 30, an interlayer insulating film 40, a planarization film 50, a pixel defined film 60, a first electrode 70a, a second electrode 70b, and an encapsulation film 90.

The buffer layer 20 may be disposed on a top surface of the base substrate 10. The buffer layer 20 may prevent the permeation of impurity elements and planarize the top surface of the base substrate 10. The buffer layer 20 may be made of various materials that may perform these functions. For example, the buffer layer 20 may be made of any one of a $SiN_x$ film, a $SiO_2$ film, and a $SiO_xN_y$ film. According to some embodiments, the buffer layer 20 may be omitted.

The semiconductor layer SM may be disposed on the buffer layer 20. The semiconductor layer SM may be made of an amorphous silicon film or a polycrystalline silicon film. The semiconductor layer SM may include a channel region which is undoped with impurities and a source region and a drain region which are p+-doped and are formed on both sides of the channel region to contact a source region and a drain region, respectively. Here, impurities used to dope the source and drain regions may be boron (B)-containing P-type impurities such as $B_2H_6$. The type of impurities used to dope the semiconductor layer SM may vary in dependence upon the embodiment.

The gate insulating film 30 may be disposed on the semiconductor layer SM. The gate insulating film 30 may insulate the gate electrode G from the semiconductor layer SM. The gate insulating film 30 may be made of $SiN_x$ or $SiO_2$.

The gate electrode G may be disposed on the gate insulating film 30. The gate electrode G may overlap at least a region of the semiconductor layer SM. A voltage applied to the gate electrode G may control the semiconductor layer SM to be conductive or non-conductive. For example, when a relatively higher voltage is applied to the gate electrode G, the semiconductor layer SM may become conductive, thereby electrically connecting the drain electrode D and the source electrode S to each other. When a relatively lower voltage is applied to the gate electrode G, the semiconductor layer SM may become non-conductive, thereby insulating the drain electrode D and the source electrode S from each other.

The interlayer insulating film 40 may be disposed on the gate electrode G. The interlayer insulating film 40 may cover the gate electrode G to insulate the gate electrode G from the source electrode S and the drain electrode D. The interlayer insulating film 40 may be made of $SiN_x$ or $SiO_2$.

The source electrode S and the drain electrode D may be disposed on the interlayer insulating film 40. The source electrode S and the drain electrode D may be connected to the semiconductor layer SM respectively by contact holes that pass through the interlayer insulating film 40 and the gate insulating film 30.

The source electrode S, the drain electrode D, the gate electrode G and the semiconductor layer SM may form a thin-film transistor T. The thin-film transistor T may determine whether to deliver a signal transmitted to the source electrode S to the drain electrode D based on a voltage applied to the gate electrode G.

The planarization film 50 may be formed on the interlayer insulating film 40, the source electrode S and the drain electrode D. To increase the light-emission efficiency of the organic layer 80 disposed on the planarization film 50, the planarization film 50 may remove a step difference between top surfaces of the source electrode S and the drain electrode D and may form a flat surface.

The planarization film 50 may be made of one or more materials selected from polyacrylates resin, epoxy resin, phenolic resin, polyamides resin, polyimides resin, unsaturated polyesters resin, poly phenylenethers resin, poly phenylenesulfides resin, and benzocyclobutene (BCB).

A via hole V may be formed in the planarization film 50. The first electrode 70a may contact the drain electrode D through the via hole V and thus may be electrically connected to the drain electrode D.

The first electrode 70a may be disposed on the planarization film 50 and under the organic layer 80. The first electrode 70a may be electrically connected to the drain electrode D by the via hole V to deliver a signal transmitted to the drain electrode D to a bottom area of the organic layer 80.

The first electrode 70a may be made of a reflective conducting material, a transparent conducting material, or a semi-transparent conducting material. Examples of the reflective conducting material include lithium (Li), calcium (Ca), lithium fluoride/calcium (LiF/Ca), lithium fluoride/aluminum (LiF/Al), aluminum (Al), silver (Ag), magnesium (Mg), and gold (Au). Examples of the transparent conducting material include indium tin oxide (ITO), indium zinc oxide (IZO), zinc oxide (ZnO), and indium oxide ($In_2O_3$). The semi-transparent conducting material may be a co-deposition material containing one or more of Mg and Ag or may be one or more of Mg, Ag, Ca, Li, and Al.

The pixel defined film 60 may be disposed on the planarization film 50. The pixel defined film 60 may define respective regions of a plurality of pixels included in the organic light-emitting display device 1000. The pixel defined film 60 does not cover the entire top surface of the planarization film 50. An aperture A may be formed in a region of the top surface of the planarization film 50 which is not covered by the pixel defined film 60. The top surface of the first electrode 70a may be exposed through the aperture A of the pixel defined film 60. The organic layer 80 may be disposed on the first electrode 70a in the aperture A.

The second electrode 70b may be disposed on the organic layer 80. The second electrode 70b may be made of, but not limited to, the same material as the first electrode 70a. In accordance with some embodiments, the second electrode 70b may be a common electrode disposed in the pixels of the organic light-emitting display device 1000. In accordance with some embodiments, the second electrode 70b may be disposed on the organic layer 80 and on the entire top surface of the pixel defined film 60. The light emission of the organic layer 80 may be controlled by an electric current that flows between the first electrode 70a and the second electrode 70b.

The encapsulation film 90 may be disposed on the second electrode 70b and the pixel defined film 60. The encapsulation film 90 may be disposed on the organic layer 80 to isolate the organic layer 80 from the exterior, thereby preventing or delaying the deterioration of characteristics of the organic layer 80 due to contact with oxygen or moisture.

The encapsulation film 90 may include an organic film 91 and an inorganic film 92. The order in which the organic film 91 and the inorganic film 92 are stacked may be changed. In accordance with some embodiments, the encapsulation film 90 may be a multilayer film including a plurality of organic films 91 or a plurality of inorganic films 92.

The optical layer 400 is disposed on the display substrate 100. The optical layer 400 may be disposed on an emission path of light generated by the organic layer 80 to control optical characteristics of the light generated by the organic layer 80.

The optical layer 400 includes a phase-delay film 410 and a polarizing layer 430 disposed on the phase-delay film 410. When the optical layer 400 includes the polarizing layer 430 and the phase-delay film 410, light incident from above the optical layer 400 into the organic light-emitting display device 1000 may be polarized in a certain direction as it passes through the polarizing layer 430, and a phase of the light may be changed by the phase-delay film 410 as the light passes through the phase-delay film 410. The light that passes through the phase-delay film 410 is reflected by the display substrate 100, and the reflected light passes again through the phase-delay film 410. Accordingly, the phase of the light is changed again. Here, a polarization direction of the light whose phase has been changed twice by passing through the phase-delay film 410 twice may not be the same as a polarization direction of light that is allowed by the polarizing layer 430 to pass therethrough. Therefore, the light may fail to pass through the polarizing layer 430. In this regard, when the optical layer 400 includes the phase-delay film 410 and the polarizing layer 430 disposed on the phase-delay film 410, light incident from above the optical layer 400 into the organic light-emitting display device 1000 can be prevented from being emitted again through the polarizing layer 430 due to internal reflection. As a result, black characteristics of the organic light-emitting display device 1000 may be improved.

In some embodiments, the phase-delay film 410 may delay a phase of incident light by one quarter of a wavelength. When the phase-delay film 410 delays incident light by one quarter of a wavelength, light incident from above the optical layer 400 passes through the phase-delay film 410 twice before returning to the phase-delay film 410 through internal reflection. That is, the phase of the light is delayed by half a wavelength. Accordingly, the polarization direction of the light is perpendicular to the polarization direction of light that is allowed by the polarizing layer 430 to pass therethrough. Consequently, the polarizing layer 430 may block reflected light more efficiently.

In accordance with some embodiments, the optical layer 400 may further include a first adhesive layer 420. The first adhesive layer 420 may be interposed between the polarizing layer 430 and the phase-delay film 410 to bond the polarizing layer 430 and the phase-delay film 410 together. The first adhesive layer 420 may be optically transparent. The first adhesive layer 420 may be made of, e.g., pressure sensitive adhesive (PSA).

The diffusion modules 300 may be disposed between the optical layer 400 and the display substrate 100. The diffusion modules 300 may be separated from each other and may be disposed on the bottom surface of the optical layer 400. In accordance with some embodiments, the diffusion modules 300 may be attached onto the bottom surface of the optical layer 400.

When light generated by the organic layer 80 enters the diffusion modules 300, the diffusion modules 300 may diffuse the light in various directions, thereby improving a viewing angle of the organic light-emitting display device 1000.

The phase and direction of light may change as the light passes through the diffusion modules 300. Therefore, when light incident from above the polarizing layer 430 into the organic light-emitting display device 1000 passes through the diffusion modules 300, the reflected light-blocking efficiency by the polarizer 420 may be reduced. However, since the diffusion modules 300 are disposed separately and spaced apart from each other, at least part of light incident from above the polarizing layer 430 into the organic light-emitting display device 1000 may not pass through the diffusion modules 300 until reaching the polarizing layer 430 after having been reflected by the display substrate 100. Therefore, the organic light-emitting display device 1000 including the diffusion modules 300 separated from each other may have an improved viewing angle and maintain good black characteristics. In accordance with some embodiments, the area of the bottom surface of the optical layer 400 which overlaps the diffusion modules 300 may be one fifth or less of the area of the entire bottom surface of the optical layer 400.

In accordance with some embodiments, the diffusion modules 300 may be attached to the bottom surface of the optical layer 400 to form a single optical film which includes the optical layer 400 and the diffusion modules 300.

The diffusion modules 300 will now be described in greater detail with reference to FIGS. 2 and 3.

Figure 2:
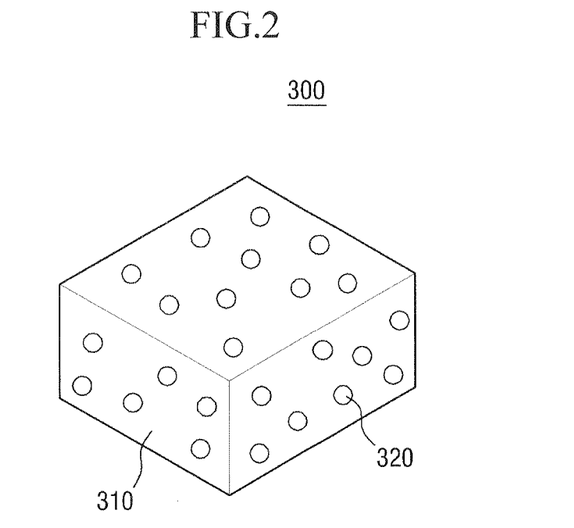
FIG. 2 is an oblique view of a diffusion module constructed with the principle of an embodiment of the present invention.

FIG. 2 is an oblique view of a diffusion module 300 constructed with the principle of an embodiment of the present invention. In reference to FIG. 2, the diffusion module 300 includes a plurality of diffusion particles 320 distributed therein. The diffusion particles 320 may be made of, but not limited to, an oxide of $SiO_2$, $ZrO_2$, $CeO_2$, or Au. As the diffusion particles 320 become smaller, they exhibit a better diffusion effect. When the diffusion particles 320 are excessively small, however, they may agglomerate together, resulting in a reduced diffusion effect. In an embodiment, a diameter of the diffusion particles 320 may be 100 to 3000 nm.

The diffusion module 300 may further include a matrix 310 in which the diffusion particles 320 are distributed. The matrix 310 may be made of a material with a different refractive index from that of the diffusion particles 320. In accordance with some embodiments, the matrix 310 may be made of transparent resin. For example, the matrix 310 may be made of at least one of, but not limited to, acryl, polycarbonate (PC), polymethylmetharcrylate (PMMA), and polyethyleneterephthalate (PET).

The diffusion module 300 shown in FIG. 2 is hexahedral. However, this is merely an example, and the diffusion module 300 can be formed in various shapes. For example, the diffusion module 300 may have, but not limited to, a lens shape, a prism shape, an embossed shape, or a polyhedral shape excluding a hexahedral shape.

Figure 3:
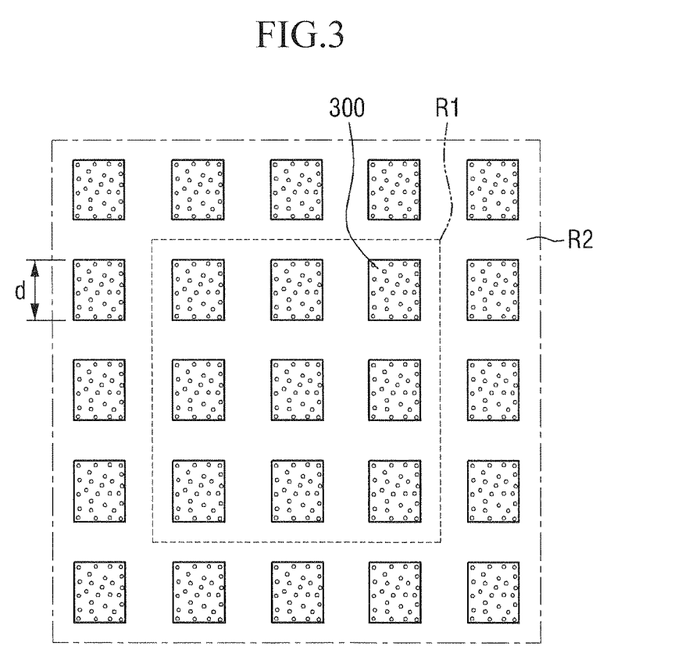
FIG. 3 is a plan view showing the arrangement of diffusion modules constructed with the principle of an embodiment of the present invention.

FIG. 3 is a plan view showing the arrangement of the diffusion modules 300 constructed with the principle of an embodiment of the present invention. In reference to FIG. 3, the diffusion modules 300 may be separated from each other and may be arranged in a matrix. Some of the diffusion modules 300 may overlap the light-emitting region R1, and the other of the diffusion modules 300 may overlap the non-light-emitting region R2. When the area of the diffusion modules 300 that overlap the light-emitting region R1 occupies an excessively high proportion of the area of the light-emitting region R1, the black characteristics of the organic light-emitting display device 1000 may deteriorate. For example, the area of the diffusion modules 3000 that overlap the light-emitting region R may be one fifth or less of the area of the light-emitting region R1.

When a width d of the diffusion modules 300 is too large, a region in which the diffusion modules 300 are located may appear relatively dark when seen from outside the organic light-emitting display device 1000. This may degrade the display quality of the organic light-emitting display device 1000. According to some embodiments, the width d of the diffusion modules 300 may be 30 μm or less. When the width d of the diffusion modules 300 is 30 μm or less, the viewing angle of the organic light-emitting display device 1000 may be improved while the region in which the diffusion modules 300 are located is not visible from the exterior of the organic light-emitting display device 1000.

In FIG. 3, the diffusion modules 300 are arranged in a matrix. However, the arrangement of the diffusion modules 300 may vary in dependence upon the embodiment. For example, rows or columns of the diffusion modules 300 may be arranged alternately, or the diffusion modules 300 may be arranged irregularly.

Turning back to FIG. 1, the organic light-emitting display device 1000 may further include a second adhesive layer 200. The second adhesive layer 200 may be interposed between the optical layer 400 and the display substrate 100 to bond the optical layer 400 and the display substrate 100 together. The second adhesive layer 200 may be made of, but not limited to, PSA.

The second adhesive layer 200 may be disposed under the diffusion modules 300. The second adhesive layer 200 may bond the diffusion modules 300 to the display substrate 100.

Hereinafter, an organic light-emitting display device constructed with the principle of another embodiment of the present invention will be described with reference to FIG. 4.

Figure 4:
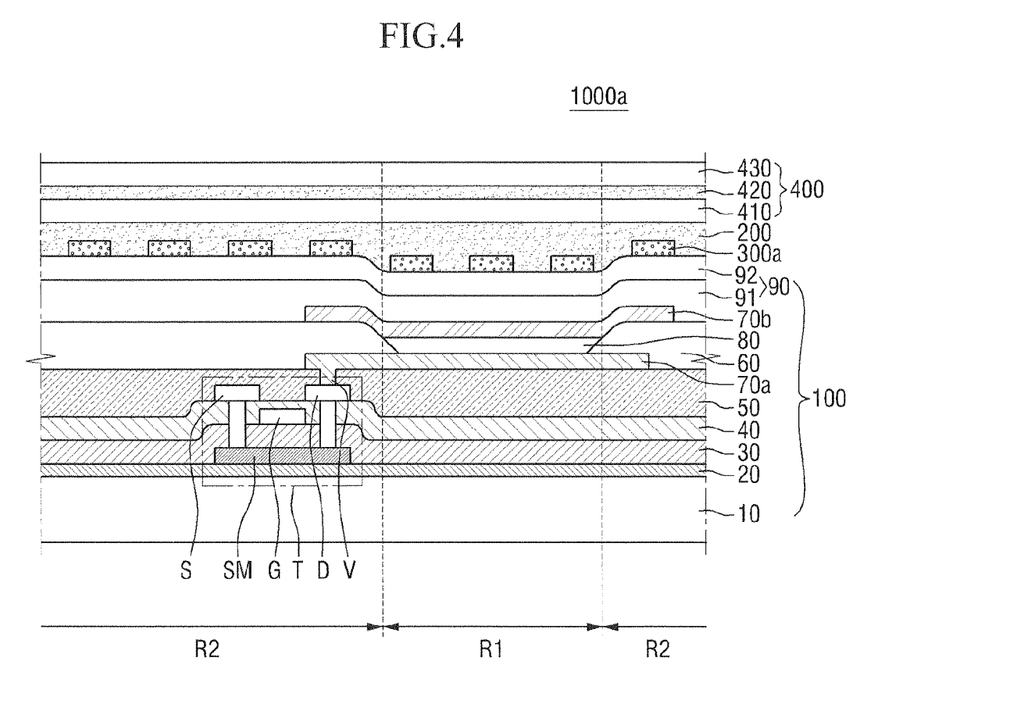
FIG. 4 is a cross-sectional view of an organic light-emitting display device constructed with the principle of another embodiment of the present invention.

FIG. 4 is a cross-sectional view of an organic light-emitting display device 1000a constructed with the principle of another embodiment of the present invention. In reference to FIG. 4, the organic light-emitting display device 1000a includes a display substrate 100, an optical layer 400, and a plurality of diffusion modules 300a. The display substrate 100 and the optical layer 400 may be substantially identical to those shown in FIG. 1.

The diffusion modules 300a may be disposed separately from each other and may be disposed on a top surface of the display substrate 100. In accordance with some embodiments, the diffusion modules 300a may be attached to the top surface of the display substrate 100. The area of the top surface of the display substrate 100 which is overlapped by the diffusion modules 300a may be one fifth or less of the area of the entire top surface of the display substrate 100, such that the organic light-emitting display device 1000a can have an improved viewing angle while maintaining good black characteristics.

The shape and configuration of the diffusion modules 300a may be substantially identical to those of the diffusion modules 300 shown in FIG. 2. In addition, the arrangement of the diffusion modules 300a may be substantially identical to that of the diffusion modules 300 shown in FIG. 3.

Hereinafter, an organic light-emitting display device according to another embodiment of the present invention will be described with reference to FIG. 5.

Figure 5:
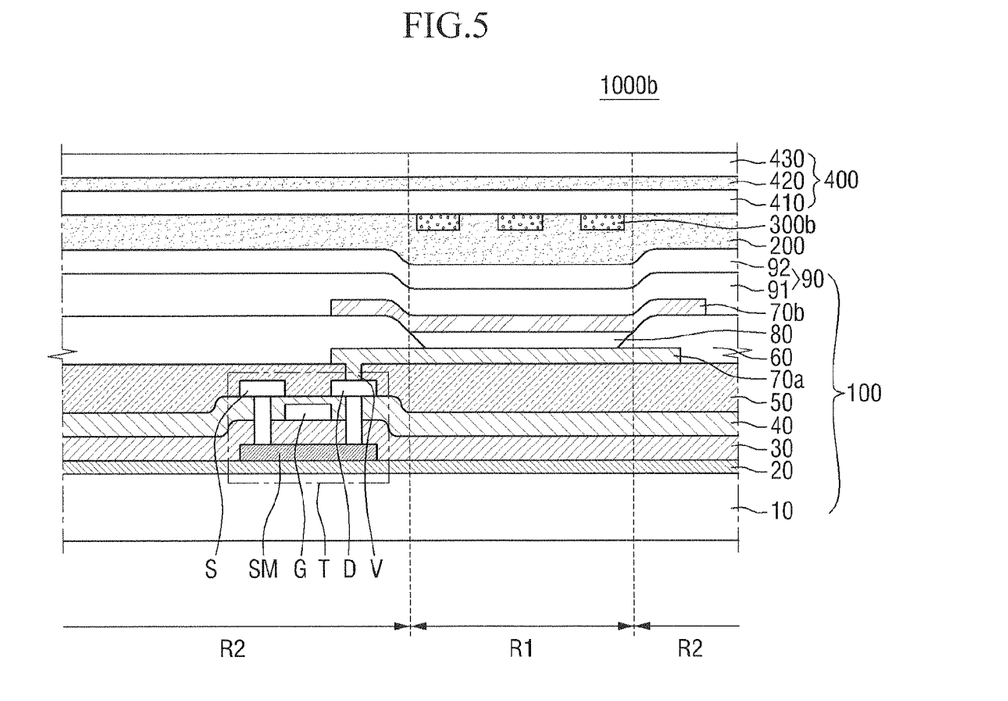
FIG. 5 is a cross-sectional view of an organic light-emitting display device constructed with the principle of another embodiment of the present invention.

FIG. 5 is a cross-sectional view of an organic light-emitting display device 1000b constructed with the principle of another embodiment of the present invention. In reference to FIG. 5, the organic light-emitting display device 1000b includes a display substrate 100, an optical layer 400, and a plurality of diffusion modules 300b. The display substrate 100 and the optical layer 400 may be substantially identical to those shown in FIG. 1.

The diffusion modules 300b may be disposed separately from each other and may be disposed on a bottom surface of the optical layer 400. The diffusion modules 300b may be disposed in a region which overlaps a light-emitting region R1 and may not be disposed in a region which overlaps a non-light-emitting region R2. When the diffusion modules 300b are not disposed in the region which overlaps the non-light-emitting region R2, a change in the phase and path of reflected light by the diffusion modules 300b may be reduced, thereby further improving black characteristics of the organic light-emitting display device 1000b. Even if the diffusion modules 300b are not disposed in the region which overlaps the non-light-emitting region R2, when the diffusion modules 300b are disposed in the region which overlaps the light-emitting region R1, the diffusion modules 300b can be located on a path of light generated by an organic layer 80. Accordingly, this may improve a viewing angle of the organic light-emitting display device 1000b.

In accordance with some embodiments, the area of the diffusion modules 300b which overlap the light-emitting region R1 may be one fifth or less of the area of the light-emitting region R1, such that the organic light-emitting display device 1000b may have an improved viewing angle while maintaining good black characteristics.

Hereinafter, an organic light-emitting display device according to another embodiment of the present invention will be described with reference to FIG. 6.

Figure 6:
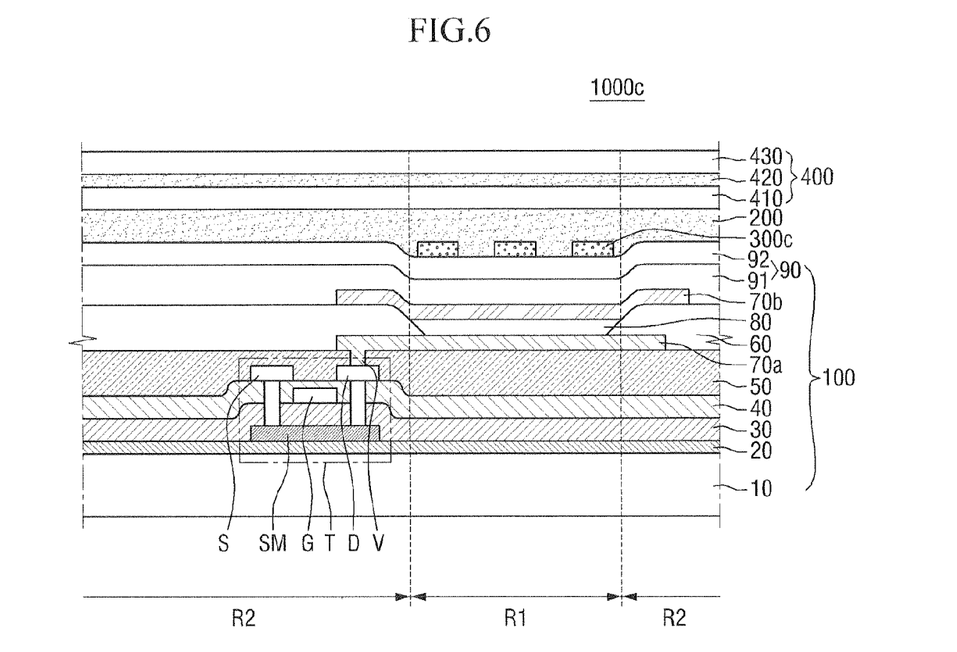
FIG. 6 is a cross-sectional view of an organic light-emitting display device constructed with the principle of another embodiment of the present invention.

FIG. 6 is a cross-sectional view of an organic light-emitting display device 1000c constructed with the principle of another embodiment of the present invention. In reference to FIG. 6, the organic light-emitting display device 1000c includes a display substrate 100, an optical layer 400, and a plurality of diffusion modules 300c. The display substrate 100 and the optical layer 400 may be substantially identical to those shown in FIG. 1.

The diffusion modules 300c may be disposed separately from each other and may be disposed on a top surface of the display substrate 100. The diffusion modules 300c may be disposed in a region which overlaps a light-emitting region R1 and may not be disposed in a region which overlaps a non-light-emitting region R2. Like the organic light-emitting display device 1000b of FIG. 5, the organic light-emitting display device 1000c of FIG. 6 includes the diffusion modules 300c which are disposed in the region that overlaps the light-emitting region R1 but are not disposed in the region that overlaps the non-light-emitting region R2. Therefore, the organic light-emitting display device 1000c may have an image viewing angle while maintaining good black characteristics.

In accordance with some embodiments, the area of the diffusion modules 300b which overlap the light-emitting region R1 may be one fifth or less of the area of the light-emitting region R1, such that the organic light-emitting display device 1000c may have an improved viewing angle while maintaining good black characteristics.

Hereinafter, an organic light-emitting display device according to another embodiment of the present invention will be described with reference to FIG. 7.

Figure 7:
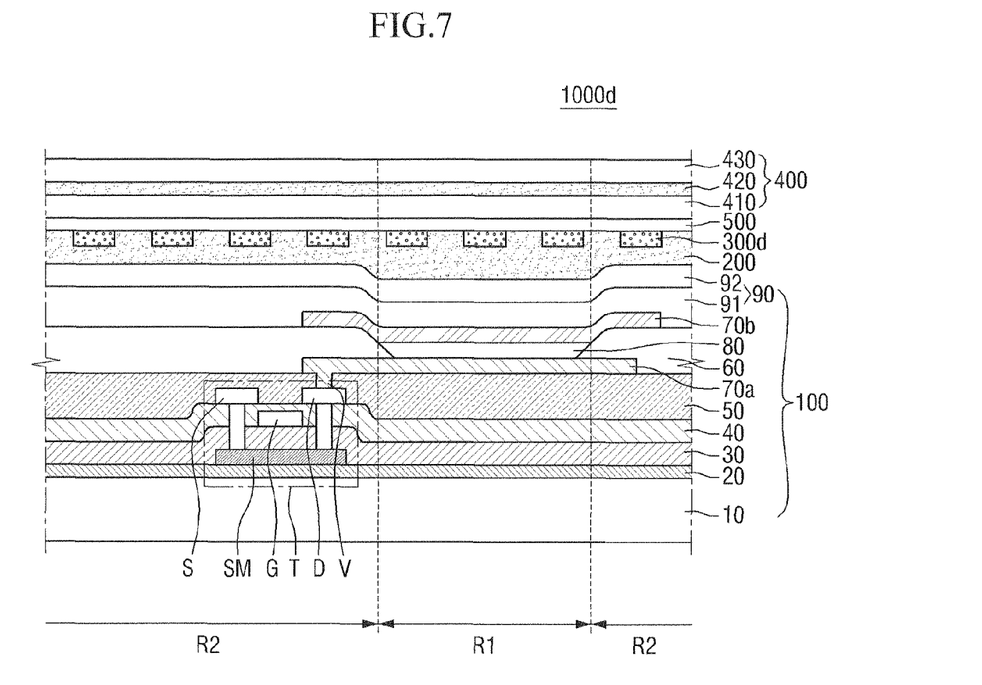
FIG. 7 is a cross-sectional view of an organic light-emitting display device constructed with the principle of another embodiment of the present invention.

FIG. 7 is a cross-sectional view of an organic light-emitting display device 1000d constructed with the principle of another embodiment of the present invention. In reference to FIG. 7, the organic light-emitting display device 1000d includes a display substrate 100, an optical layer 400, a plurality of diffusion modules 300d, and an adhesive film 500. The display substrate 100, the optical layer 400, and the diffusion modules 300d may be substantially identical to those shown in FIG. 1.

The adhesive film 500 may be attached to a bottom surface of the optical layer 400, and the diffusion modules 300d may be attached to the bottom surface of the optical layer 400 by the adhesive film 500. In accordance with some embodiments, a single film having the diffusion modules 300d attached to the adhesive film 500 may be manufactured, and the diffusion modules 300d may be easily placed on the bottom surface of the optical layer 400 by attaching the single film to the bottom surface of the optical layer 400.

In accordance with some embodiments, the optical layer 400, the adhesive film 500, and the diffusion modules 300d may form a single optical film.

Hereinafter, an organic light-emitting display device according to another embodiment of the present invention will be described with reference to FIG. 8.

Figure 8:
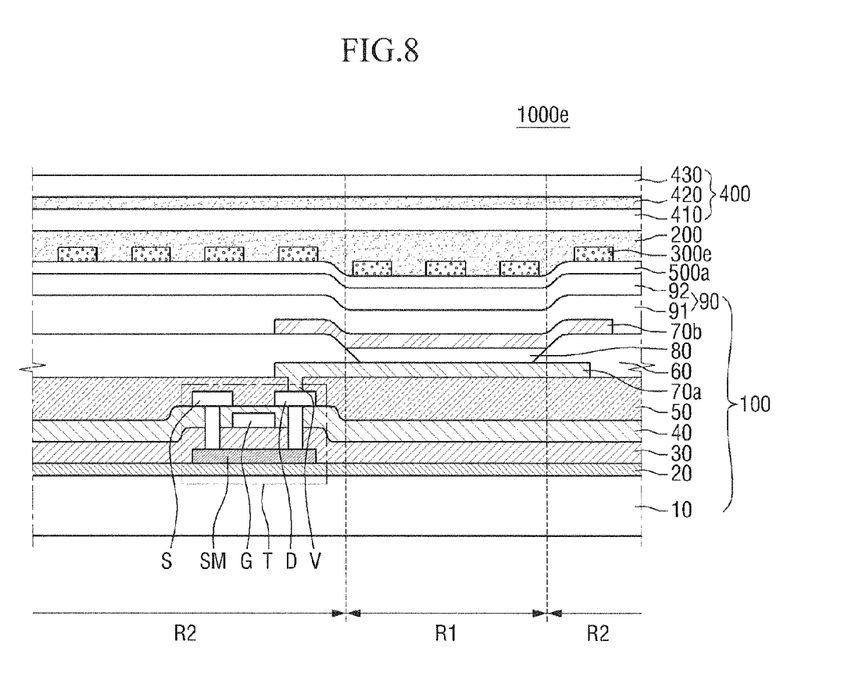
FIG. 8 is a cross-sectional view of an organic light-emitting display device constructed with the principle of another embodiment of the present invention.

FIG. 8 is a cross-sectional view of an organic light-emitting display device 1000e constructed with the principle of another embodiment of the present invention. In reference to FIG. 8, the organic light-emitting display device 1000e includes a display device 100, an optical layer 400, a plurality of diffusion modules 300e, and an adhesive film 500a. The display substrate 100, the optical layer 400, and the diffusion modules 300e may be substantially identical to those shown in FIG. 4.

The adhesive film 500a may be attached to a top surface of the display substrate 100, and the diffusion modules 300e may be attached to the top surface of the display substrate by the adhesive film 500a. In accordance with some embodiments, a single film having the diffusion modules 300e attached to the adhesive film 500a may be manufactured, and the diffusion modules 300e may be easily placed on the top surface of the display substrate 100 by attaching the single film to the top surface of the display substrate 100.

Hereinafter, an organic light-emitting display device according to another embodiment of the present invention will be described with reference to FIG. 9.

Figure 9:
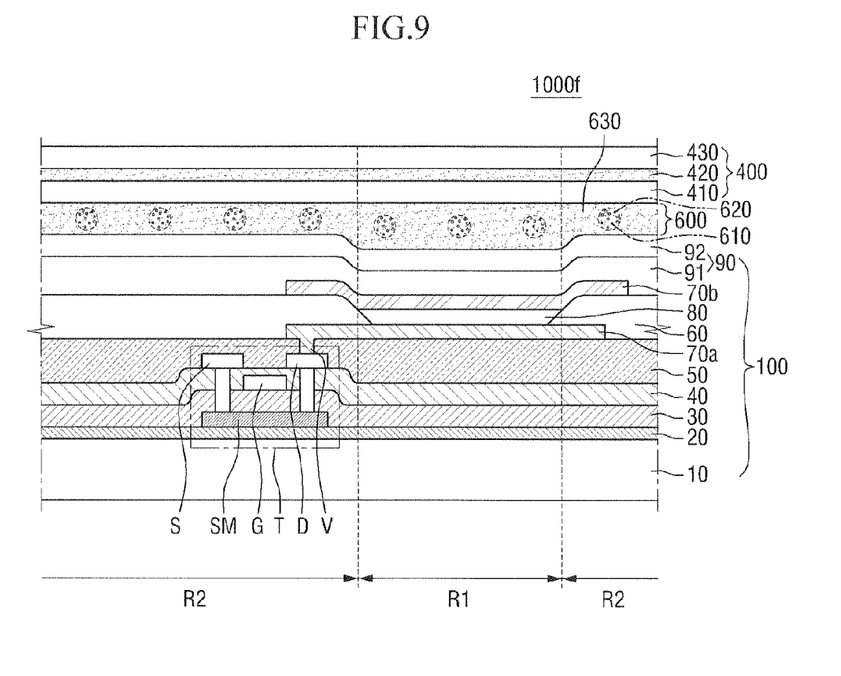
FIG. 9 is a cross-sectional view of an organic light-emitting display device constructed with the principle of another embodiment of the present invention.

FIG. 9 is a cross-sectional view of an organic light-emitting display device 1000f constructed with the principle of another embodiment of the present invention. In reference to FIG. 9, the organic light-emitting display device 1000f includes a display substrate 100, an optical layer 400, and a third adhesive layer 600.

The third adhesive layer 600 is disposed between the display substrate 100 and the optical layer 400 to bond the display substrate 100 and the optical layer 400 together. The third adhesive layer 600 may be made of a transparent adhesive such as PSA.

The third adhesive layer 600 includes a plurality of diffusion particles 610 distributed therein. The diffusion particles 610 may be substantially identical to the diffusion particles 320 shown in FIG. 2. The distribution of the diffusion particles 610 in the third adhesive layer 600 may not be uniform. The third adhesive layer 600 may include a plurality of diffusion regions 620, each having a relatively higher density of the diffusion particles 610, and a transmission region 630 having a relatively lower density of the diffusion particles 610. Each of the diffusion regions 620 may be shaped like an island surrounded by the transmission region 630. The diffusion regions 620 may be separated from each other. In accordance with some embodiments, the diffusion regions 620 may be arranged at regular intervals. The diffusion particles 620 are included in each of the diffusion regions 620 to be separated from each other. The diffusion regions 620 may play substantially the same function as the diffusion modules 300 shown in FIG. 1. In accordance with some embodiments, the diffusion particles 610 may not be included in the transmission region 630. Due to the third adhesive layer 600 which includes the diffusion regions 620 and the transmission region 630, the organic light-emitting display device 1000ƒ may have an improved viewing angle and maintain good black characteristics.

Hereinafter, an organic light-emitting display device according to another embodiment of the present invention will be described with reference to FIG. 10.

Figure 10:
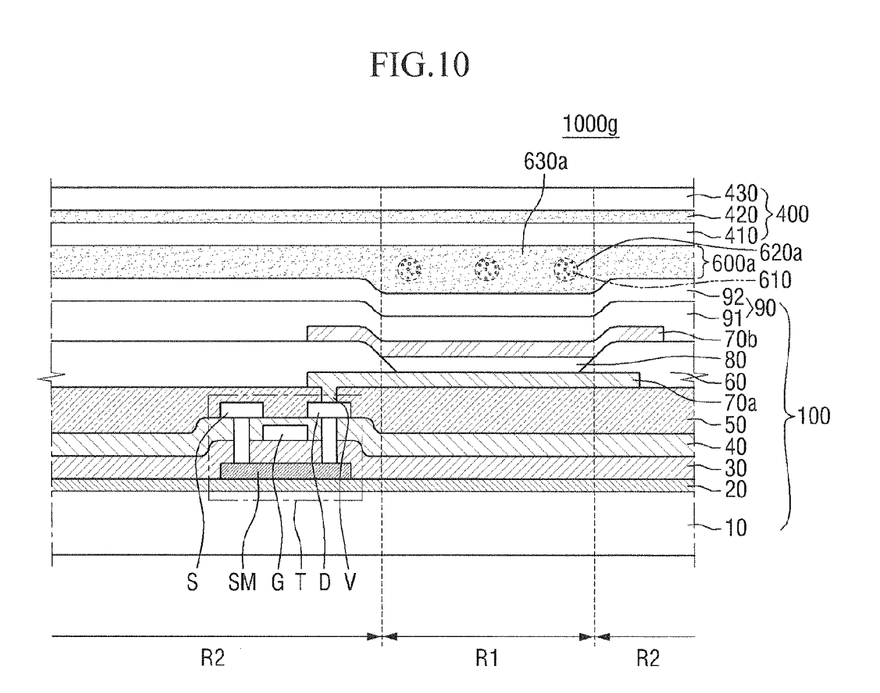
FIG. 10 is a cross-sectional view of an organic light-emitting display device constructed with the principle of another embodiment of the present invention.

FIG. 10 is a cross-sectional view of an organic light-emitting display device 1000g constructed with the principle of another embodiment of the present invention. In reference to FIG. 10, the organic light-emitting display device 1000g includes a display substrate 100, an optical layer 400, and a third adhesive layer 600a.

The third adhesive layer 600a includes a plurality of diffusion particles 610 distributed therein. The third adhesive layer 600a may include a plurality of diffusion regions 620a, each having a relatively higher density of the diffusion particles 610, and a transmission region 630a having a relatively lower density of the diffusion particles 610. The diffusion regions 620a may be disposed in a region which overlaps a light-emitting region R1 and may not be disposed in a region which overlaps a non-light-emitting region R2. When the diffusion regions 620a are disposed in the region which overlaps the light-emitting region R1 but not in the region which overlaps the non-light-emitting region R2, the organic light-emitting display device 1000g, like the organic light-emitting display device 1000b of FIG. 5, can have an improved viewing angle while maintaining better black luminance characteristics. Other features of the diffusion regions 620a and the transmission region 630a are substantially identical to those of the diffusion regions 620 and the transmission region 630 shown in FIG. 9.

Hereinafter, a diffusion module according to another embodiment of the present invention will be described with reference to FIG. 11.

Figure 11:
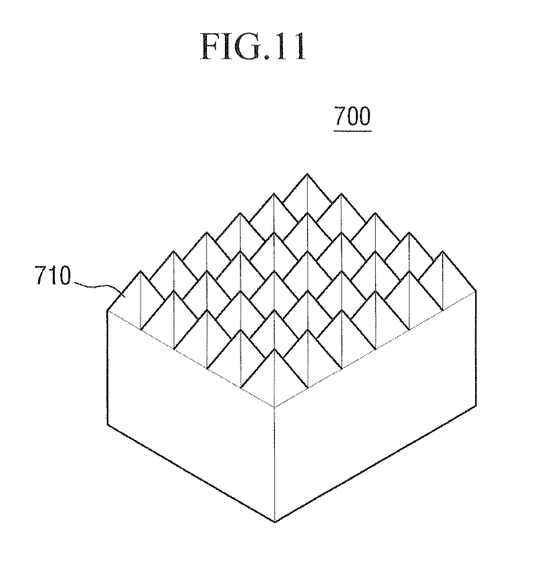
FIG. 11 is a perspective view of a diffusion module constructed with the principle of another embodiment of the present invention.

FIG. 11 is a perspective view of a diffusion module 700 constructed with the principle of another embodiment of the present invention. In reference to FIG. 11, the diffusion module 700 may include a plurality of diffusion protrusions 710 on a surface thereof. The diffusion protrusions 710 may make the surface of the diffusion module 700 uneven to diffuse incident light in various directions. In FIG. 11, the diffusion protrusions 710 are arranged regularly. However, the arrangement of the diffusion protrusions 710 may vary in dependence upon the embodiment. Thus, the diffusion protrusions 710 may be arranged irregularly. Also, the diffusion protrusions 710 may have various shapes including a triangular pyramid shape, a quadrangular pyramid shape, a lens shape, and an irregular shape.

In accordance with some embodiments, the diffusion module 700 may replace the diffusion module shown in FIGS. 1 through 10.

In accordance with some other embodiments, the diffusion module 700 may include both the diffusion protrusions 710 and diffusion particles 320 of FIG. 2.

Embodiments of the present invention provide at least one of the following advantages.

A viewing angle of an organic light-emitting display device may be improved.

In addition, the organic light-emitting display device may maintain good black characteristics while having an improved viewing angle.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. An organic light-emitting display device, comprising:
a base substrate;
a polarizing layer polarizing light which passes through the polarizing layer;
a phase-delay film changing a phase of light which passes through the phase-delay film, the phase-delay film disposed between the base substrate and the polarizing layer;
an organic layer disposed between the base substrate and the phase-delay film; and
a plurality of diffusion modules disposed between the organic layer and the phase-delay film, the plurality of diffusion modules disposed separately and spaced apart from each other.

2. The display device of claim 1, wherein each of the plurality of diffusion modules comprises a matrix and a plurality of diffusion particles distributed within the matrix, and a refractive index of the diffusion particles is different from that of the matrix.

3. The display device of claim 2, wherein the diffusion particles have a diameter of 100 to 3000 nm.

4. The display device of claim 1, wherein the diffusion modules have a width of 30 μm or less.

5. The display device of claim 1, wherein the display substrate comprises an encapsulation film disposed on the organic layer to encapsulate the organic layer, and the encapsulation film comprises one or more organic films and one or more inorganic films.

6. The display device of claim 1, wherein the diffusion modules are attached to a bottom surface of the optical layer.

7. The display device of claim 6, wherein an area of the bottom surface of the optical layer which overlaps the diffusion modules is one fifth or less of an area of the entire bottom surface of the optical layer.

8. The display device of claim 6, further comprising an adhesive film attached to the bottom surface of the optical layer, with the diffusion modules attached to the bottom surface of the optical layer by the adhesive film.

9. The display device of claim 1, wherein the diffusion modules are attached to a top surface of the display substrate.

10. The display device of claim 9, wherein an area of regions of the top surface of the display substrate to which the diffusion modules are attached is one fifth or less of an area of the entire top surface of the display substrate.

11. The display device of claim 9, further comprising an adhesive film attached to the top surface of the display substrate, with the diffusion modules attached to the top surface of the display substrate by the adhesive film.

12. The display device of claim 1, further comprising an adhesive layer disposed between the display substrate and the optical layer.

13. The display device of claim 1, wherein the display substrate comprises a light-emitting region and a non-light-emitting region, and the diffusion modules are disposed on the light-emitting region.

14. The display device of claim 13, wherein an area of the light-emitting region overlapped by the diffusion modules is one fifth or less of an area of the light-emitting region.

15. An organic light-emitting display device, comprising:
   a display substrate comprising a base substrate and an organic layer disposed on the base substrate;
   an optical layer disposed on the display substrate, the optical layer comprising a phase-delay film and a polarizing layer disposed on the phase-delay film, the phase-delay film changing a phase of light which passes through the phase-delay film, the polarizing layer polarizing light which passes through the polarizing layer; and
   an adhesive layer disposed between the display substrate and the optical layer, the adhesive layer comprising a plurality of diffusion particles, the adhesive layer comprising:
      a diffusion region having a higher density of the diffusion particles; and
      a transmission region having a lower density of the diffusion particles.

16. The display device of claim 15, wherein the phase-delay film delays a phase of incident light by one quarter of a wavelength of the incident light.

17. The display device of claim 15, wherein a size of the diffusion particles is 100 to 3000 nm.

18. The display device of claim 15, wherein the display substrate comprises a light-emitting region and a non-light-emitting region, and the diffusion region overlaps the light-emitting region.

19. An optical film, comprising:
   a polarizer polarizing light which passes through the polarizer;
   a phase-delay film disposed under the polarizer, the phase-delay film changing a phase of light which passes through the phase-delay film;
   a plurality of diffusion modules disposed under the phase-delay film and disposed separately and spaced apart from each other, and each diffusion module comprising a plurality of diffusion particles; and
   an adhesive film disposed on a bottom surface of the phase-delay film, with the diffusion modules attached to the phase-delay film by the adhesive film.

* * * * *